(12) United States Patent  (10) Patent No.: US 8,490,461 B2
Sasaki et al.  (45) Date of Patent: Jul. 23, 2013

(54) ANGULAR VELOCITY SENSOR (75) Inventors: Takeshi Sasaki, Osaka (JP); Keisuke Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 31 days.

(21) Appl. No.: 12/996,634

(22) PCT Filed: Mar. 8, 2010

(86) PCT No.: PCT/JP2010/001583
§ 371 (c)(1),
(2), (4) Date: Dec. 7, 2010

(87) PCT Pub. No.: WO2010/103776
PCT Pub. Date: Sep. 16, 2010

(65) Prior Publication Data
US 2012/0024057 A1    Feb. 2, 2012

(30) Foreign Application Priority Data
Mar. 10, 2009   (JP) ................. 2009-056197

(51) Int. Cl.
*G01C 19/56* (2012.01)

(52) U.S. Cl.
USPC .................... 73/1.37; 73/504.12

(58) Field of Classification Search
USPC .................. 73/1.37, 1.77, 504.12
See application file for complete search history.

(56) References Cited

U.S. PATENT DOCUMENTS

| | | | |
|---|---|---|---|
| 5,719,460 A | 2/1998 | Watarai et al. | |
| 6,445,195 B1 | 9/2002 | Ward | |
| 6,588,275 B2 * | 7/2003 | Kato et al. | 73/504.12 |
| 8,033,171 B2 * | 10/2011 | Kurihara | 73/504.12 |
| 2002/0020219 A1 | 2/2002 | DeRoo et al. | |
| 2004/0187576 A1 | 9/2004 | Ito | |
| 2006/0277996 A1 | 12/2006 | Kuroda et al. | |
| 2007/0220972 A1 | 9/2007 | Araki et al. | |
| 2008/0295596 A1 | 12/2008 | Zhang et al. | |

FOREIGN PATENT DOCUMENTS

| | | |
|---|---|---|
| CN | 1777789 A | 5/2006 |
| CN | 1985149 A | 6/2007 |
| CN | 101055188 A | 10/2007 |
| CN | 100439864 C | 12/2008 |
| JP | 08-210860 | 8/1996 |
| JP | 10-300475 A | 11/1998 |
| JP | 10-318754 A | 12/1998 |
| JP | 2001-304866 A | 10/2001 |

(Continued)

OTHER PUBLICATIONS

International Search Report for International Application No. PCT/JP2010/001583, May 18, 2010, Panasonic Corporation.

*Primary Examiner* — John Chapman, Jr.
(74) *Attorney, Agent, or Firm* — RatnerPrestia (57) ABSTRACT

In an angular velocity sensor, there is generated a first parasitic capacitance generated between a first driving electrode and a sensing electrode, and there is generated a second parasitic capacitance generated between a second driving electrode and the sensing electrode. The ratio of the amplitude of a first drive signal to the amplitude of a second drive signal is set to the reciprocal of the ratio of the first parasitic capacitance to the second parasitic capacitance. This allows the noise contents generated by capacitive coupling to be efficiently offset, thereby improving detection accuracy of an angular velocity sensing signal.

6 Claims, 5 Drawing Sheets

FOREIGN PATENT DOCUMENTS

| | | |
|---|---|---|
| JP | 2004-294405 A | 10/2004 |
| JP | 2004-347398 A | 12/2004 |
| WO | WO 01/69266 A1 | 9/2001 |
| WO | WO 02/10678 A1 | 2/2002 |

* cited by examiner

ANGULAR VELOCITY SENSOR

This application is a U.S. National Phase Application of PCT International Application PCT/JP2010/001583.

TECHNICAL FIELD

The present invention relates to angular velocity sensors used in digital cameras, car navigation systems, vehicle control devices, and other similar devices.

BACKGROUND ART

Figure 9:
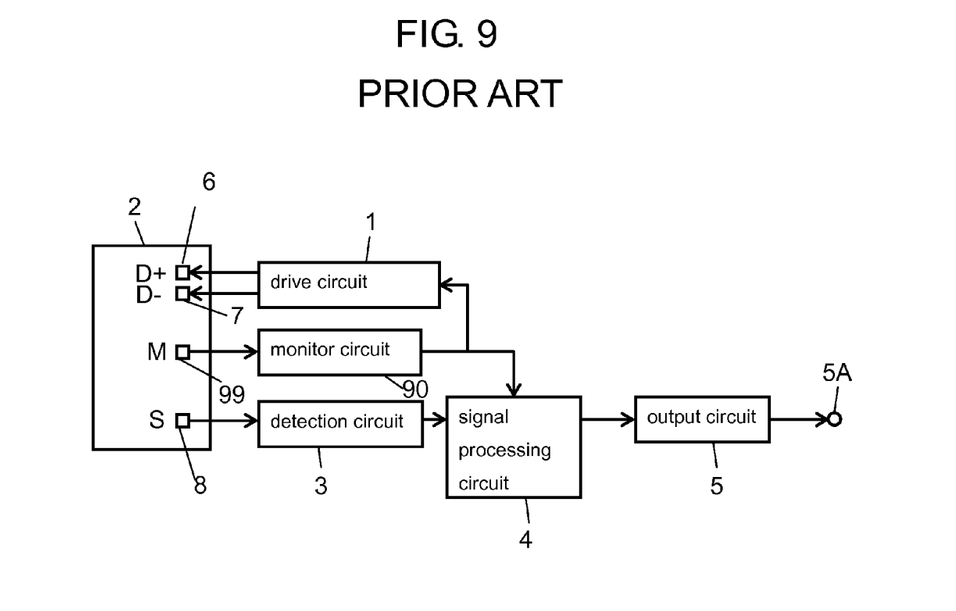
FIG. 9 is an electrical diagram of the conventional angular velocity sensor.
Figure 10:
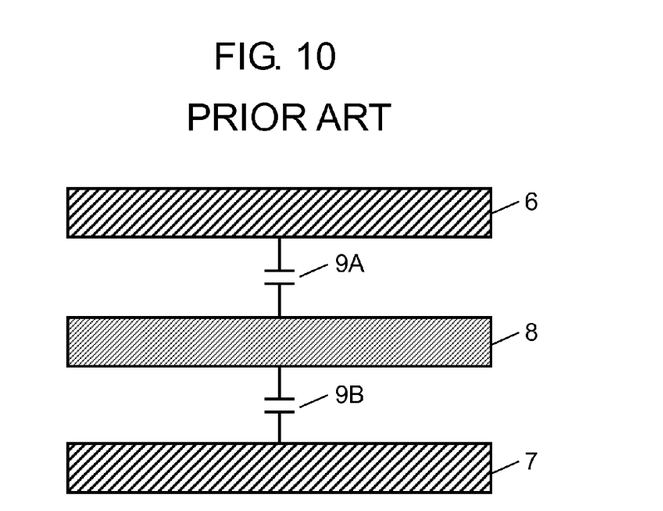
FIG. 10 shows first and second driving electrodes and a sensing electrode in the conventional angular velocity sensor when viewed from the above.

FIG. 9 is an electrical diagram of a conventional angular velocity sensor, and FIG. 10 shows first and second driving electrodes and a sensing electrode in this conventional sensor when viewed from the above.

As shown in FIG. 9, the conventional angular velocity sensor includes drive circuit 1, detection device 2, and detection circuit 3. Detection device 2 vibrates in response to drive signals from drive circuit 1. Detection circuit 3 extracts a response signal from sensing electrode 8 of detection device 2, and outputs the signal. The sensor further includes signal processing circuit 4 and output circuit 5. Signal processing circuit 4 extracts an angular velocity sensing signal from the response signal and outputs the angular velocity sensing signal. Output circuit 5 includes output terminal 5A through which the angular velocity sensing signal from signal processing circuit 4 is outputted. Detection device 2 includes monitor electrode 99, which is connected to monitor circuit 90 for outputting a monitor signal. The monitor signal is used, for example, to control the amplitudes of drive signals in drive circuit 1 or to detect signals in signal processing circuit 4.

As shown in FIG. 10, detection device 2 includes first and second driving electrodes 6 and 7, and sensing electrode 8. Drive circuit 1 inputs a first drive signal to first driving electrode 6, and a second drive signal having a polarity opposite to that of the first drive signal to second driving electrode 7, thereby vibrating detection device 2.

An example of a conventional technique related to the present invention is shown in Patent Literature 1 shown below.

Such conventional angular velocity sensors have a problem that their angular velocity sensing signals have low detection accuracy. More specifically, in the above-described conventional sensor, the angular velocity sensing signal has noise by the influence of parasitic capacitance 9A between first driving electrode 6 and sensing electrode 8, and parasitic capacitance 9B between second driving electrode 7 and sensing electrode 8. As a result, the angular velocity sensing signal has low detection accuracy.

CITATION LIST

Patent Literature 1: Japanese Patent Unexamined Publication No. H08-210860

SUMMARY OF THE INVENTION

According to the angular velocity sensor of the present invention, there is generated a first parasitic capacitance between a first driving electrode and a sensing electrode, and there is generated a second parasitic capacitance between a second driving electrode and the sensing electrode. The magnitude relation between the amplitudes of first and second drive signals is set opposite to the magnitude relation between the first and second parasitic capacitances. This reduces the difference between the product of the first parasitic capacitance and the amplitude of the first drive signal and the product of the second parasitic capacitance and the amplitude of the second drive signal. The capacitive coupling between the first driving electrode and the sensing electrode generates a noise content, and the capacitive coupling between the second driving electrode and the sensing electrode generates another noise content. These noise contents are efficiently offset from each other, thereby improving detection accuracy of an angular velocity sensing signal.

DETAILED DESCRIPTION OF PREFERRED EMBODIMENT

Exemplary Embodiment

An angular velocity sensor according to an exemplary embodiment of the present invention will be described as follows with reference to drawings.

Figure 1:
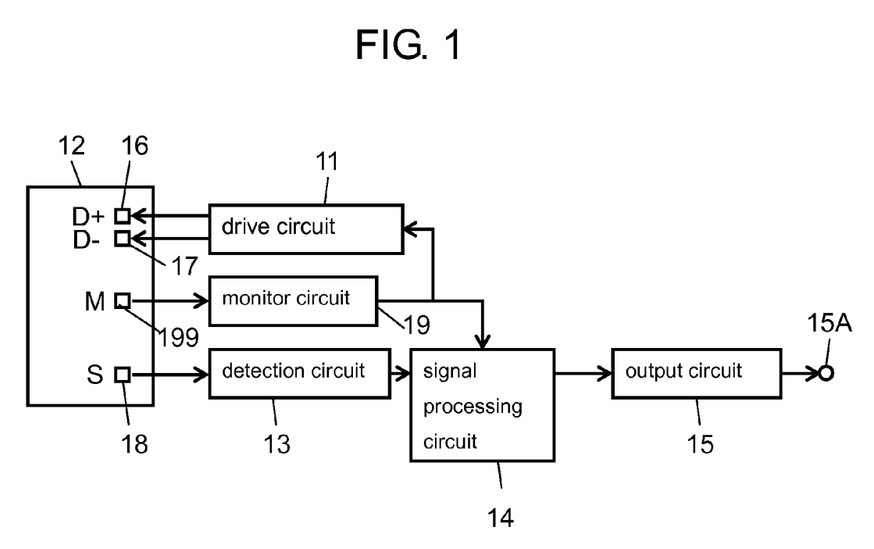
FIG. 1 is an electrical diagram of an angular velocity sensor according to an exemplary embodiment of the present invention.
Figure 2:
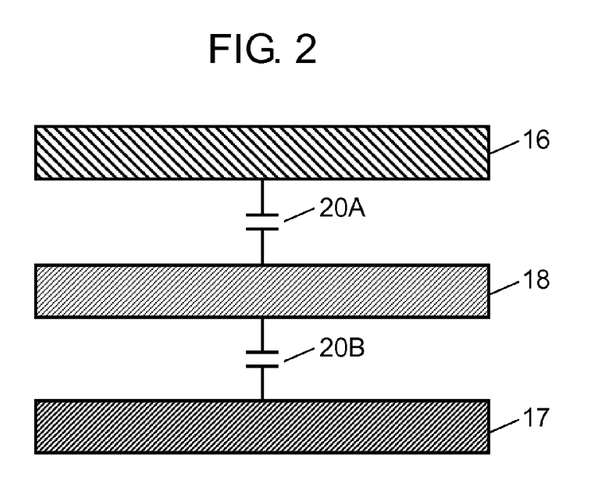
FIG. 2 shows first and second driving electrodes and a sensing electrode in the angular velocity sensor according to the exemplary embodiment of the present invention when viewed from the above.

FIG. 1 is an electrical diagram of the angular velocity sensor according to the exemplary embodiment. FIG. 2 shows first and second driving electrodes and a sensing electrode in the angular velocity sensor when viewed from the above.

The angular velocity sensor includes drive circuit 11, detection device 12, and detection circuit 13. Detection device 12 vibrates in response to drive signals from drive circuit 11. Detection circuit 13 extracts a response signal from sensing electrode 18 of detection device 12, and outputs the signal. The sensor further includes signal processing circuit 14 and output circuit 15. Signal processing circuit 14 extracts an angular velocity sensing signal from the response signal and outputs the angular velocity sensing signal. Output circuit 15 includes output terminal 15A through which the angular velocity sensing signal from signal processing circuit 14 is outputted. Detection device 12 includes monitor electrode 199, which is connected to monitor circuit 19 for outputting a monitor signal. The monitor signal is used, for example, to control the amplitudes of drive signals in drive circuit 11 or to detect signals in signal processing circuit 14.

Detection device 12 includes first and second driving electrodes 16 and 17, and sensing electrode 18. Drive circuit 11 inputs a first drive signal to first driving electrode 16 and a second drive signal having a polarity opposite to that of the first drive signal to second driving electrode 17, thereby vibrating detection device 12.

FIG. 2 shows the first and second driving electrodes and the sensing electrode in the angular velocity sensor according to the exemplary embodiment when viewed from the above. As shown in FIG. 2, there is generated first parasitic capacitance 20A between first driving electrode 16 and sensing electrode 18, and there is generated second parasitic capacitance 20B between second driving electrode 17 and sensing electrode 18. The magnitude relation between the amplitudes of the first and second drive signals is set opposite to the magnitude relation between first and second parasitic capacitances 20A and 20B. More specifically, for example, when first parasitic capacitance 20A is larger than second parasitic capacitance 20B, the amplitude of the first drive signal is made smaller than the amplitude of the second drive signal. This can improve detection accuracy of the angular velocity sensing signal.

The following is a description of the relation between the drive signals and noise contents, and the principle to improve the detection accuracy.

Figure 3:
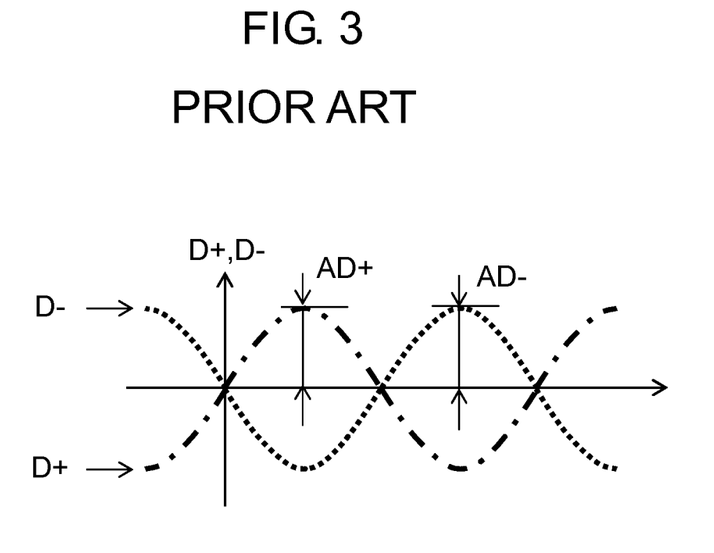
FIG. 3 shows voltage waveforms of drive signals in a conventional angular velocity sensor.
Figure 4:
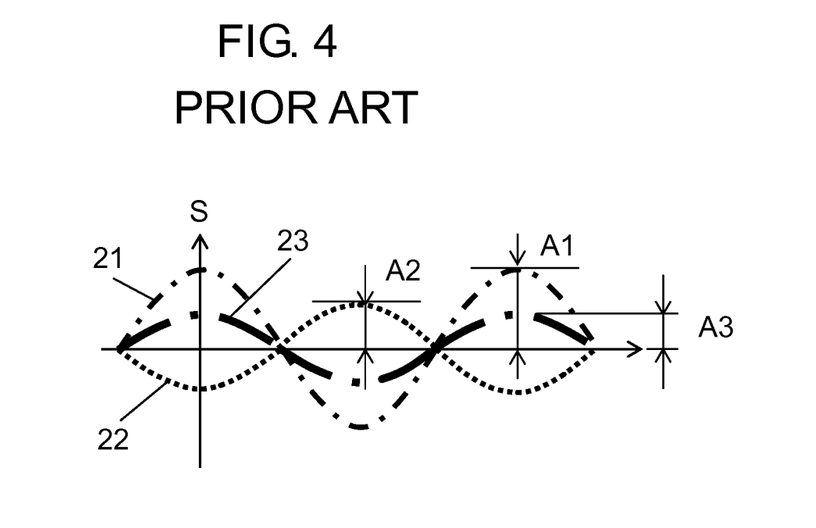
FIG. 4 shows voltage waveforms of noise contents generated in the conventional angular velocity sensor.

FIG. 3 shows voltage waveforms of drive signals in the conventional angular velocity sensor, and FIG. 4 shows voltage waveforms of noise contents generated in this sensor.

As shown in FIG. 3, in this sensor, first driving electrode 6 is applied with an AC voltage D+ as the first drive signal. Second driving electrode 7 is applied with an AC voltage D− as the second drive signal having a phase opposite to that of the first drive signal. Assume that the AC voltage D+ has an amplitude AD+, and the AC voltage D− has an amplitude AD−, which is equal to the amplitude AD+, and that parasitic capacitance 9A shown in FIG. 2 is twice as large as parasitic capacitance 9B.

As shown in FIG. 4, the capacitive coupling between first driving electrode 16 and sensing electrode 18 generates noise content 21 having an amplitude A1. The capacitive coupling between second driving electrode 17 and sensing electrode 18 generates noise content 22 having an amplitude A2. The amplitude A1 is twice as large as the amplitude A2. This is because the amplitude of a noise content generated by the capacitive coupling between electrodes increases in proportion to the product of the size of a parasitic capacitance and the amplitude of a drive signal. As a result, the addition of noise contents 21 and 22 generates noise content 23 having amplitude A3, thereby causing a decrease in detection accuracy of the angular velocity sensing signal.

Figure 5:
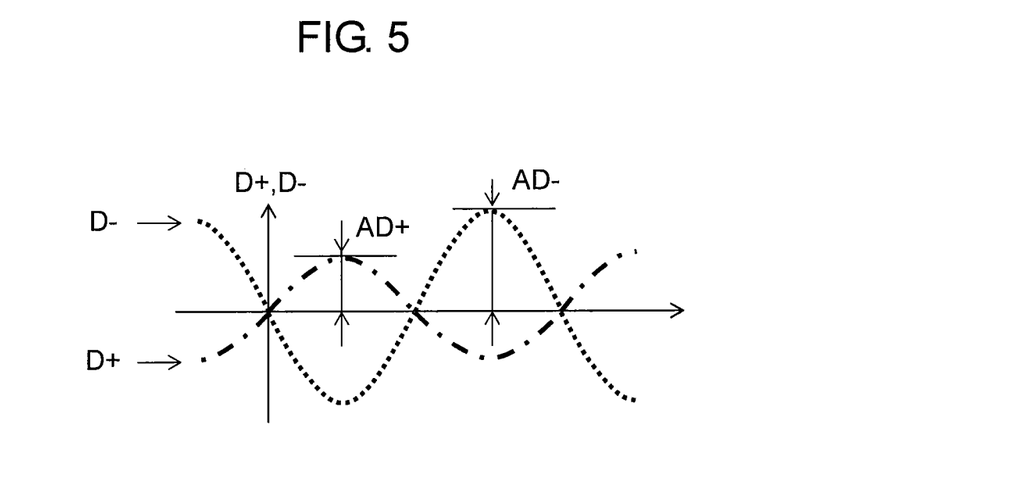
FIG. 5 shows voltage waveforms of drive signals in the angular velocity sensor according to the exemplary embodiment of the present invention.
Figure 6:
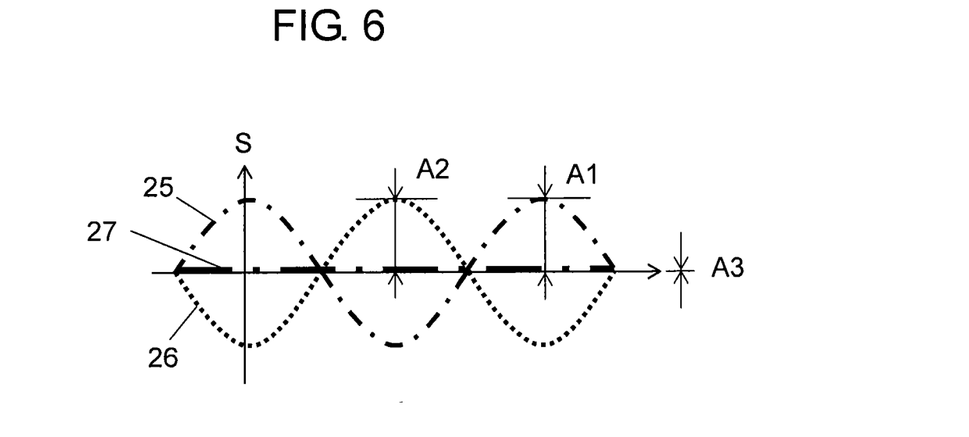
FIG. 6 shows voltage waveforms of noise contents generated in the angular velocity sensor according to the exemplary embodiment of the present invention.

FIG. 5 shows voltage waveforms of drive signals in the angular velocity sensor according to the present exemplary embodiment. FIG. 6 shows voltage waveforms of noise contents generated in this sensor.

In the present embodiment, the magnitude relation between the amplitudes of the first and second drive signals is set opposite to the magnitude relation between first and second parasitic capacitances 20A and 20B. For example, assume that first parasitic capacitance 20A shown in FIG. 2 is larger than second parasitic capacitance 20B. Then, the amplitude AD+ of the AC voltage D+ to be applied as the first drive signal to first driving electrode 16 is made smaller than the amplitude AD− of the AC voltage D− to be applied as the second drive signal to second driving electrode 17 as shown in FIG. 5. This reduces the difference between the product of first parasitic capacitance 20A and the amplitude of the first drive signal and the product of second parasitic capacitance 20B and the amplitude of the second drive signal. As a result, when the capacitive coupling between first driving electrode 16 and sensing electrode 18 generates noise content 25, and the capacitive coupling between second driving electrode 17 and sensing electrode 18 generates noise content 26 as shown in FIG. 6, noise contents 25 and 26 are efficiently offset from each other. The addition of contents 25 and 26 generates noise content 27, which has low amplitude A3, thereby improving detection accuracy of the angular velocity sensing signal.

Detection device 12 is included in the angular velocity sensor in the exemplary embodiment; however, the present invention can be implemented even when detection device 12 is disposed outside the sensor. In other words, the angular velocity sensor of the present invention can be implemented by including the drive circuit, the detection circuit, and the signal processing circuit, and receiving an output from detection device 12 disposed outside the sensor.

The present invention can also be implemented by connecting output terminal 15A to the output of signal processing circuit 14, and removing output circuit 15.

It is more preferable to set the amplitudes of the first and second drive signals as follows. The ratio of the amplitude of the first drive signal to the amplitude of the second drive signal is set to the reciprocal of the ratio of first parasitic capacitance 20A generated between first driving electrode 16 and sensing electrode 18 to second parasitic capacitance 20B generated between second driving electrode 17 and sensing electrode 18. For example, assume that first parasitic capacitance 20A shown in FIG. 2 is twice as large as second parasitic capacitance 20B. Then, as shown in FIG. 5, the amplitude AD+ of the AC voltage D+ to be applied as the first drive signal to first driving electrode 16 is made one-half of the amplitude AD− of the AC voltage D− applied as the second drive signal to second driving electrode 17. In this case, the product of first parasitic capacitance 20A and the amplitude AD+ of the first drive signal becomes equal to the product of second parasitic capacitance 20B and the amplitude AD− of the second drive signal. As a result, as shown in FIG. 6, it becomes possible to offset noise content 25 generated by the capacitive coupling between first driving electrode 16 and sensing electrode 18, and noise content 26 generated by the capacitive coupling between second driving electrode 17 and sensing electrode 18 from each other. This further improves detection accuracy of the angular velocity sensing signal.

In the angular velocity sensor of the present exemplary embodiment, each amplitude of the first and second drive signals of the angular velocity sensor are not adjusted as an adjustment process in such a manner as to minimize noise in the angular velocity sensing signal by properly adjusting the ratio of the amplitude of the first drive signal to the amplitude of the second drive signal. Instead, the amplitudes of the first and second drive signals are designed as follows. The magnitude relation between the amplitudes of the first and second drive signals is opposite to the magnitude relation between first parasitic capacitance 20A generated between first driving electrode 16 and sensing electrode 18 and second parasitic capacitance 20B generated between second driving electrode 17 and sensing electrode 18. This allows the amplitudes of the first and second drive signals to be set directly, eliminating the need to provide the above-mentioned adjustment process, thereby improving productivity, and providing the angular velocity sensor with high detection accuracy.

Figure 7:
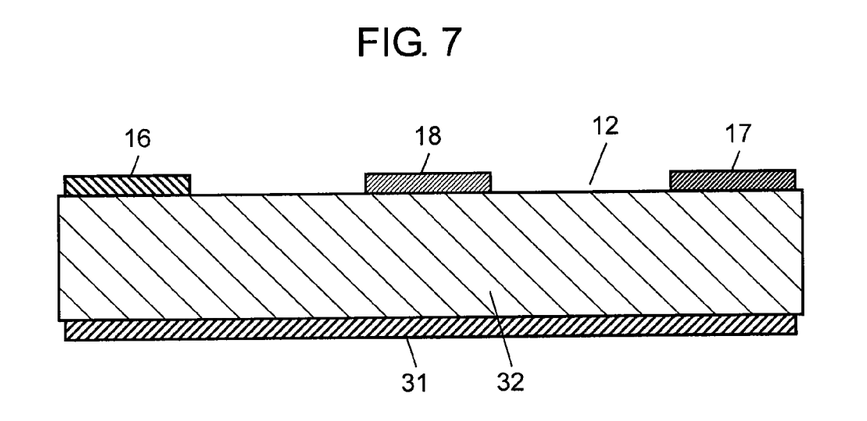
FIG. 7 is a sectional view of an example of electrode arrangement in the angular velocity sensor according to the exemplary embodiment of the present invention.

FIG. 7 is a sectional view of an example of electrode arrangement in the angular velocity sensor according to the present exemplary embodiment. As shown in FIG. 7, detection device 12 includes piezoelectric body 32, which has first and second driving electrodes 16 and 17 and sensing electrode 18 on one side, and reference electrode 31 on the other side. As described above, the effect of the present invention can be obtained by making the magnitude relation between the amplitudes of the first and second drive signals opposite to the magnitude relation between the first and second parasitic capacitances.

In that case, however, the amplitude difference between the first drive signal to be inputted to first driving electrode 16 and the second drive signal to be inputted to second driving electrode 17 causes piezoelectric body 32 to have a non-uniform distribution of strains within it. This may cause detection device 12 to generate unwanted vibration.

Figure 8:
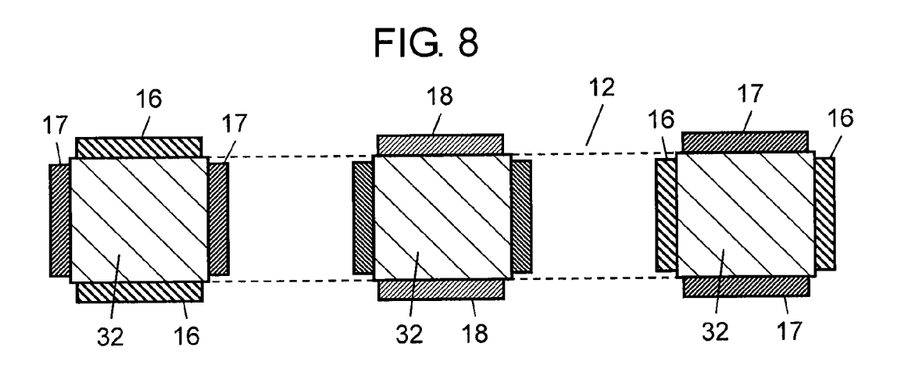
FIG. 8 is a sectional view of another example of the electrode arrangement in the angular velocity sensor according to the exemplary embodiment of the present invention.

FIG. 8 is a sectional view of another example of the electrode arrangement in the angular velocity sensor according to the present exemplary embodiment. As shown in FIG. 8, the unwanted vibration can be prevented by driving detection device 12 by the differential between the first drive signal to be inputted to first driving electrode 16 and the second drive signal to be inputted to second driving electrode 17, without using the reference electrode. Thus, also in the structure of FIG. 8, there is generated a first parasitic capacitance between first driving electrode 16 and sensing electrode 18, and there is generated a second parasitic capacitance between second driving electrode 17 and sensing electrode 18. In that case, the amplitude of the first drive signal and the amplitude of the second drive signal are set to be different from each other so that the magnitude relation between these amplitudes can be opposite to the magnitude relation between the first and second parasitic capacitances. In the structure of FIG. 8, detection device 12 is not driven by the electric potential difference between driving electrode 16 and a reference electrode (not included in the structure of FIG. 8) and the electric potential difference between driving electrode 17 and the reference electrode (not included in the structure of FIG. 8). Instead, detection device 12 is driven by the electric potential difference (voltage) between driving electrode 16 and driving electrode 17. In this case, the difference between the first and second drive signals is constant, making the distribution of strains less non-uniform in piezoelectric body 32. This reduces the occurrence of the above-mentioned unwanted vibration in detection device 12.

Regarding parasitic capacitances, it is preferable to consider the following case, in addition to the above-described parasitic capacitances generated between sensing electrode 18 and each of first and second driving electrodes 16 and 17.

When drive circuit 11 and first driving electrode 16 are connected via a first drive-signal path, and detection circuit 13 and sensing electrode 18 are connected via a detection-signal path, there is a first parasitic capacitance generated between the first drive-signal path and first driving electrode 16, and the detection-signal path and sensing electrode 18.

When drive circuit 11 and second driving electrode 17 are connected via a second drive-signal path, and detection circuit 13 and sensing electrode 18 are connected via the detection-signal path, there is a second parasitic capacitance generated between the second drive-signal path and second driving electrode 17, and the detection-signal path and sensing electrode 18.

In that case, it is preferable that the magnitude relation between the amplitudes of the first and second drive signals be set opposite to the magnitude relation between the first and second parasitic capacitances.

Drive circuit 11, which has been described as a single drive circuit, can alternatively consist of two separate drive circuits: a first drive circuit connected to first driving electrode 16 and a second drive circuit connected to second driving electrode 17.

The device structure and the electrode arrangement shown in FIG. 8 is only one example to implement the present invention. Similar effects can be obtained as long as the detection device is driven by a differential structure (in which the detection device is driven by the electric potential difference between a positive-polarity driving voltage and a negative-polarity driving voltage).

In the present invention, it is possible to set the magnitude relation between the parasitic capacitances, the magnitude relation between the amplitudes of the drive signals, the ratio of the parasitic capacitances, and the ratio of the amplitudes by using a control means controlled by dedicated hardware, or by using an LSI, an arithmetic device, or other devices controlled by software.

INDUSTRIAL APPLICABILITY

The angular velocity sensor of the present invention is useful in digital cameras, car navigation systems, vehicle control devices, and other similar devices because of having high detection accuracy of the angular velocity sensing signal.

REFERENCE MARKS IN THE DRAWINGS 11 drive circuit
12 detection device
13 detection circuit
14 signal processing circuit
16 first driving electrode
17 second driving electrode
18 sensing electrode
19 monitor circuit
20A first parasitic capacitance
20B second parasitic capacitance
199 monitor electrode

The invention claimed is:
1. An angular velocity sensor comprising:
a drive circuit;
a detection device vibrating in response to a drive signal from the drive circuit;
a detection circuit for extracting a response signal from the detection device and outputting the response signal; and
a signal processing circuit for extracting an angular velocity sensing signal from the response signal and outputting the angular velocity sensing signal, wherein
the detection device includes:
  first and second driving electrodes;
  a piezoelectric body; and
  a sensing electrode,
the piezoelectric body is positioned between the first driving electrode and the second driving electrode,
the drive circuit inputs a first drive signal to the first driving electrode, and a second drive signal to the second driving electrode, the second drive signal having a polarity opposite to a polarity of the first drive signal, and drives the detection device by a differential between the first drive signal and the second drive signal without using a reference electrode,
a magnitude relation between an amplitude of the first drive signal and an amplitude of the second drive signal is set opposite to a magnitude relation between a first parasitic capacitance and a second parasitic capacitance, the first parasitic capacitance being generated between the first driving electrode and the sensing electrode, and the second parasitic capacitance being generated between the second driving electrode and the sensing electrode.

2. The angular velocity sensor of claim 1, wherein
the drive circuit comprises:
   a first drive circuit connected to the first driving electrode; and
   a second drive circuit connected to the second driving electrode.

3. The angular velocity sensor of claim 1, wherein
a ratio of the amplitude of the first drive signal to the amplitude of the second drive signal is a reciprocal of a ratio of the first parasitic capacitance to the second parasitic capacitance.

4. An angular velocity sensor comprising:
a drive circuit;
a detection device vibrating in response to a drive signal from the drive circuit;
a detection circuit for extracting a response signal from the detection device and outputting the response signal; and
a signal processing circuit for extracting an angular velocity sensing signal from the response signal and outputting the angular velocity sensing signal, wherein
the detection device includes:
   a first driving electrode connected to the drive circuit via a first drive-signal path;
   a second driving electrode connected to the drive circuit via a second drive-signal path;
   a piezoelectric body; and
   a sensing electrode connected to the detection circuit via a detection-signal path, the piezoelectric body is positioned between the first driving electrode and the second driving electrode,
the drive circuit inputs a first drive signal to the first driving electrode, and a second drive signal to the second driving electrode, the second drive signal having a polarity opposite to a polarity of the first drive signal, and drives the detection device by a differential between the first drive signal and the second drive signal without using a reference electrode,
a magnitude relation between an amplitude of the first drive signal and an amplitude of the second drive signal is set opposite to a magnitude relation between a first parasitic capacitance and a second parasitic capacitance, the first parasitic capacitance being generated between the first drive-signal path and the first driving electrode, and the detection-signal path and the sensing electrode, and
the second parasitic capacitance being generated between the second drive-signal path and the second driving electrode, and the detection-signal path and the sensing electrode.

5. The angular velocity sensor of claim 4, wherein
the drive circuit comprises:
   a first drive circuit connected to the first driving electrode; and
   a second drive circuit connected to the second driving electrode.

6. The angular velocity sensor of claim 4, wherein
a ratio of the amplitude of the first drive signal to the amplitude of the second drive signal is a reciprocal of a ratio of the first parasitic capacitance to the second parasitic capacitance.

* * * * *